United States Patent [19]
Feige et al.

[11] Patent Number: 5,906,072
[45] Date of Patent: May 25, 1999

[54] MOTOR-VEHICLE DOOR

[75] Inventors: Stefan Feige, Iserlohn; Thomas Hülsmann, Velbert; Klaus-Peter Reis, Deternerlehe, all of Germany

[73] Assignee: Kiekert AG, Heiligenhaus, Germany

[21] Appl. No.: 09/122,414

[22] Filed: Jul. 24, 1998

[30] Foreign Application Priority Data

Jul. 26, 1997 [DE] Germany .............................. 197 32 225

[51] Int. Cl.⁶ ........................................................ B60J 5/04
[52] U.S. Cl. ............................................ 49/502; 296/146.7
[58] Field of Search ................... 49/501, 502; 296/146.5, 296/146.7

[56] References Cited

U.S. PATENT DOCUMENTS

| | | | |
|---|---|---|---|
| 5,127,191 | 7/1992 | Ohta ........................................ | 49/502 X |
| 5,345,721 | 9/1994 | Stein et al. ................................ | 49/502 |
| 5,603,548 | 2/1997 | Gandhi et al. .......................... | 49/502 X |

FOREIGN PATENT DOCUMENTS

| | | |
|---|---|---|
| 0 336 565 | 10/1989 | European Pat. Off. . |
| 195 24 232 | 5/1996 | Germany . |
| 44 26 426 | 9/1996 | Germany . |
| 195 09 282 | 11/1996 | Germany . |
| 196 50 531 | 6/1997 | Germany . |

*Primary Examiner*—Jerry Redman
*Attorney, Agent, or Firm*—Herbert Dubno; Andrew Wilford

[57] ABSTRACT

A motor-vehicle door has an outer door panel, an annular inner door panel including a front frame member fixed to the outer door panel, a lower frame member fixed to the outer door panel, a separate upper frame member, and a rear frame member fixed to the outer door panel. The front, lower, and rear members together form an opening and the front frame member is formed with a pair of vertically spaced hinge holes each having a horizontal front part and a downwardly and rearwardly inclined rear part. An insert plate carries the upper frame member, fits in the opening, and is provided with hinge lugs engaged in the openings. The insert plate is pivotal about the lugs in the hinge holes between a raised position projecting inward from the door and a lowered position fitting in the opening. Mechanical, electromechanical, and electronic subassemblies are fixed on the insert plate, and fasteners retain the insert plate on the inner door panel in the lowered position of the plate.

11 Claims, 10 Drawing Sheets

MOTOR-VEHICLE DOOR

FIELD OF THE INVENTION

The present invention relates to a motor vehicle door.

BACKGROUND OF THE INVENTION

A standard motor-vehicle door has an outer door panel, an annular inner door panel including a front, rear, upper, and lower frame members fixed to the outer door panel and defining an opening. An insert fits in the opening and carries mechanical, electromechanical, and electronic subassemblies. Fasteners retain the insert on the inner door panel. The subassemblies can include the door latch, an air bag, a controller, the inside door handle, the window and its operating mechanism, and one or more loudspeakers.

It is standard to use a so called window cassette as the insert. This is therefore a fairly complex assembly that must be meticulously fitted and secured to the inner door panel. This job is particularly complex because the window part must be fitted up through the slot formed between the upper frame member of the inner panel and the outer panel.

German patent 4,426,426 of Morando described a system where the window and its mounting hardware are pivotally mounted on the insert. Such an arrangement facilitates assembly, but substantially increases the cost of the window cassette.

In another system described in German patent document 195 24 232 of Rodermund the insert is fitted in the annular inner door panel, normally slipped up from below. The door latch is subsequently passed through a hole in the insert and special seals and the like are provided to subdivide the interior of the door into an outer so-called wet compartment into which water may gain entry along the lower edge of the window and an inner dry compartment holding the fragile and moisture-sensitive electrical and mechanical components. Assembling such a door is a multistep operation involving fitting in the insert, securing it in place, then mounting the latch and seals and securing them in place.

OBJECTS OF THE INVENTION

It is therefore an object of the present invention to provide an improved motor-vehicle door.

Another object is the provision of such an improved motor-vehicle door which overcomes the above-given disadvantages, that is which can be assembled in a short simple operation and that costs no more to construct than the prior-art doors.

SUMMARY OF THE INVENTION

A motor-vehicle door has according to the invention an outer door panel, an annular inner door panel including a front frame member fixed to the outer door panel, a lower frame member fixed to the outer door panel, a separate upper frame member, and a rear frame member fixed to the outer door panel. The front, lower, and rear members together form an opening and the front frame member is formed with a pair of vertically spaced hinge holes each having a horizontal front part and a downwardly and rearwardly inclined rear part. An insert plate carries the upper frame member, fits in the opening, and is provided with hinge lugs engaged in the openings. The insert plate is pivotal about the lugs in the hinge holes between a raised position projecting inward from the door and a lowered position fitting in the opening. Mechanical, electromechanical, and electronic subassemblies are fixed on the insert plate, and fasteners retain the insert plate on the inner door panel in the lowered position of the plate.

Thus this insert plate with the inside-panel upper frame member and all the subassemblies can be preassembled. Fitting it to the door shell is a simple job of just engaging the lugs in the hinge holes, making the necessary electrical connections, and then pivoting the insert in and down into position so the fasteners can be set to permanently secure it in place. Such an operation can be done extremely quickly using a preassembled and tested insert so that the vehicle-production line can operate at high speed.

According to the invention the plate is unitarily formed of plastic with the lugs and with guides. The subassemblies include a window having sliders displaceable in the guides. In addition the plate has a rear edge formed as an offset flange in turn formed with a throughgoing hole and the subassemblies include a latch engaging through the hole. Furthermore the plate is formed with a plurality of seats and the subassemblies include a drive in one of the seats for the window, an air bag in another of the seats, an electronic controller in another of the seats, a loudspeaker in another of the seats, and an inside door handle in another of the seats. Cables and rollers are mounted on the plate and connected between the drive and the window and an inside lock rod is connected to the latch and mounted on the plate. Thus the insert can include absolutely every part of the door except its shell, the fasteners that secure it in place, and the inside decor panel.

The upper frame member in accordance with the invention is a pair of joined-together metallic profiles fixed to an upper edge of the plate. The two parts are riveted together and to opposite faces of the insert plate, making a rigid assembly capable of offering good structural strength in the completed door.

The plate has a lower edge formed with a rearmost fixed attachment location and, forward therefrom, a plurality of movable attachment locations. The fasteners project through the attachment locations into the lower frame member. More particularly the attachment locations are formed as frusto-pyramidal projections having flat apices through which the respective fasteners project and side walls. The side walls of the movable attachment locations are of reduced wall thickness and elastically deformable. This allows the plate to accommodate minor discrepancies in the tolerances of the inner door panel.

A peripheral seal is provided between the insert plate and the members. Thus the insert plate itself serves to subdivide the interior of the door into an outside wet compartment and an inside dry compartment, eliminating the need for separate foil to do this job. In addition an electrical connection tape interconnects the electromechanical and electronic subassemblies and is mounted on the plate.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
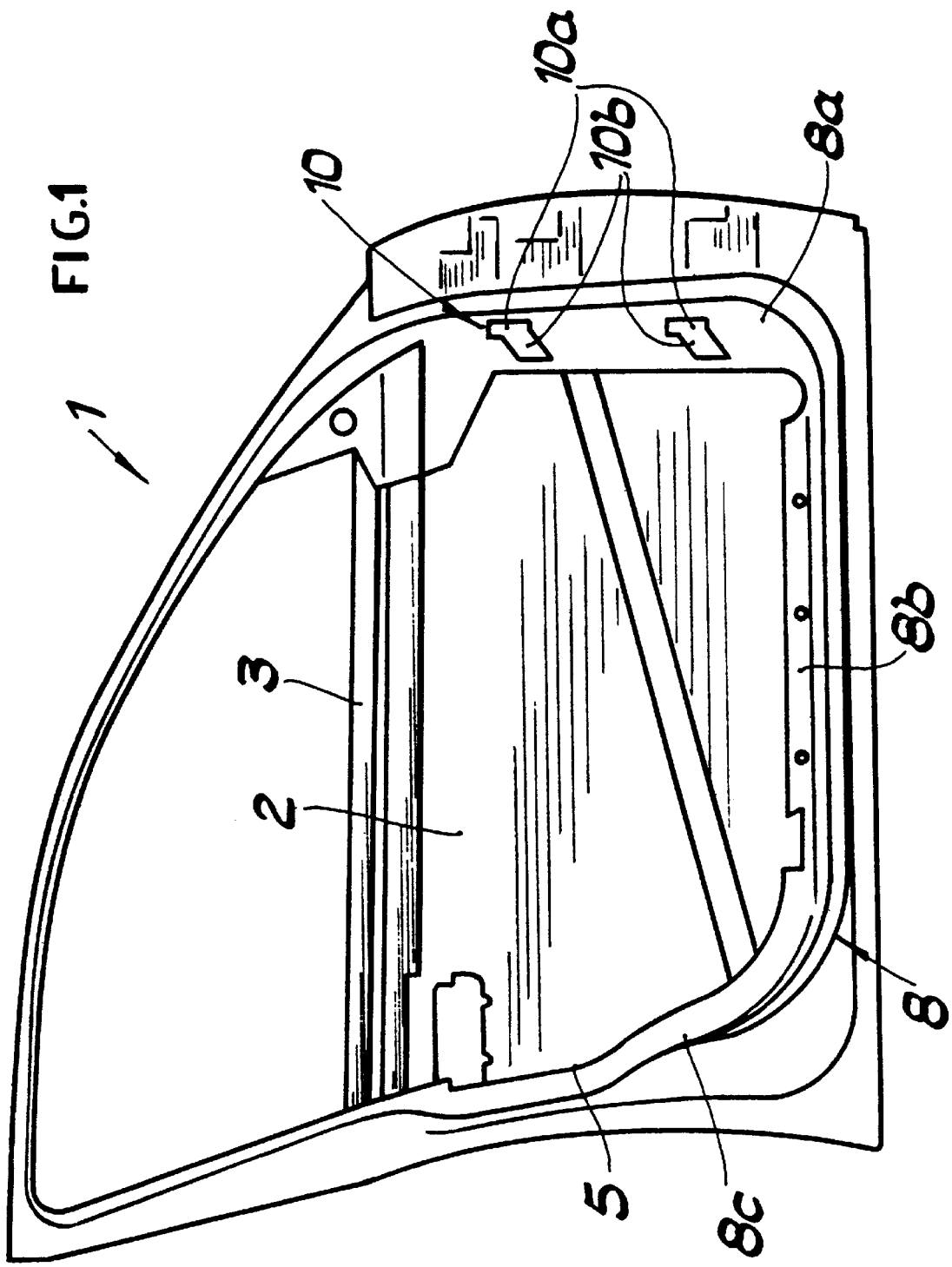
FIG. 1 is a view from inside of a door shell according to the invention.
Figure 2:
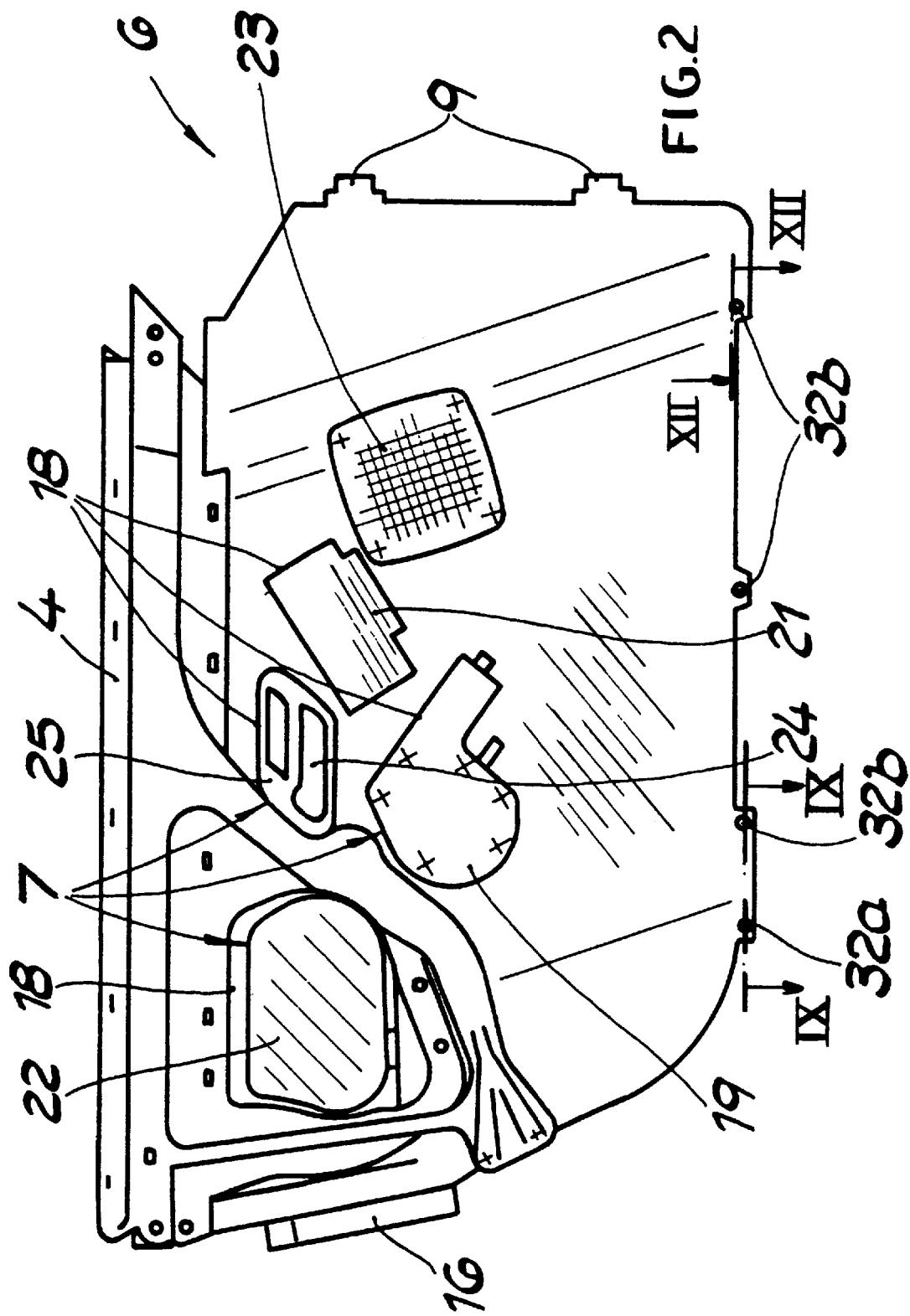
FIG. 2 is a view from inside of a door insert in accordance with the invention.

The drawing shows a motor-vehicle door 1 having a shell formed by an outer metal panel 2 with a frame 3 and a inner panel forming an inwardly open opening 5. An insert plate 6 formed basically as a plastic panel carrying a plurality of electrical, electromechanical, and electronic subassemblies 7 fits within this opening 5. The door shell has an inner frame 8 having in turn an upper frame member 4, an upright front member 8a, a lower horizontal sill member 8b, and a generally upright rear member 8c, the latter being adjacent the unillustrated rear door post. The members 8a, 8b, and 8c are permanently fixed to the outer door panel 2 and the member 4 is fixed to the insert plate 6.

The insert plate 6 is provided with the inner frame 4 and has on its front edge a pair of hinge lugs 9 that fit within respective hinge apertures 10 formed in the front member 8a and having front portions 10a that, when the lugs 9 move in them, cause the insert plate 6 to move basically horizontally, and a downwardly and rearwardly inclined rear portion 10b that, when the lugs 9 move in them, cause the insert to move back and down.

Figure 6:
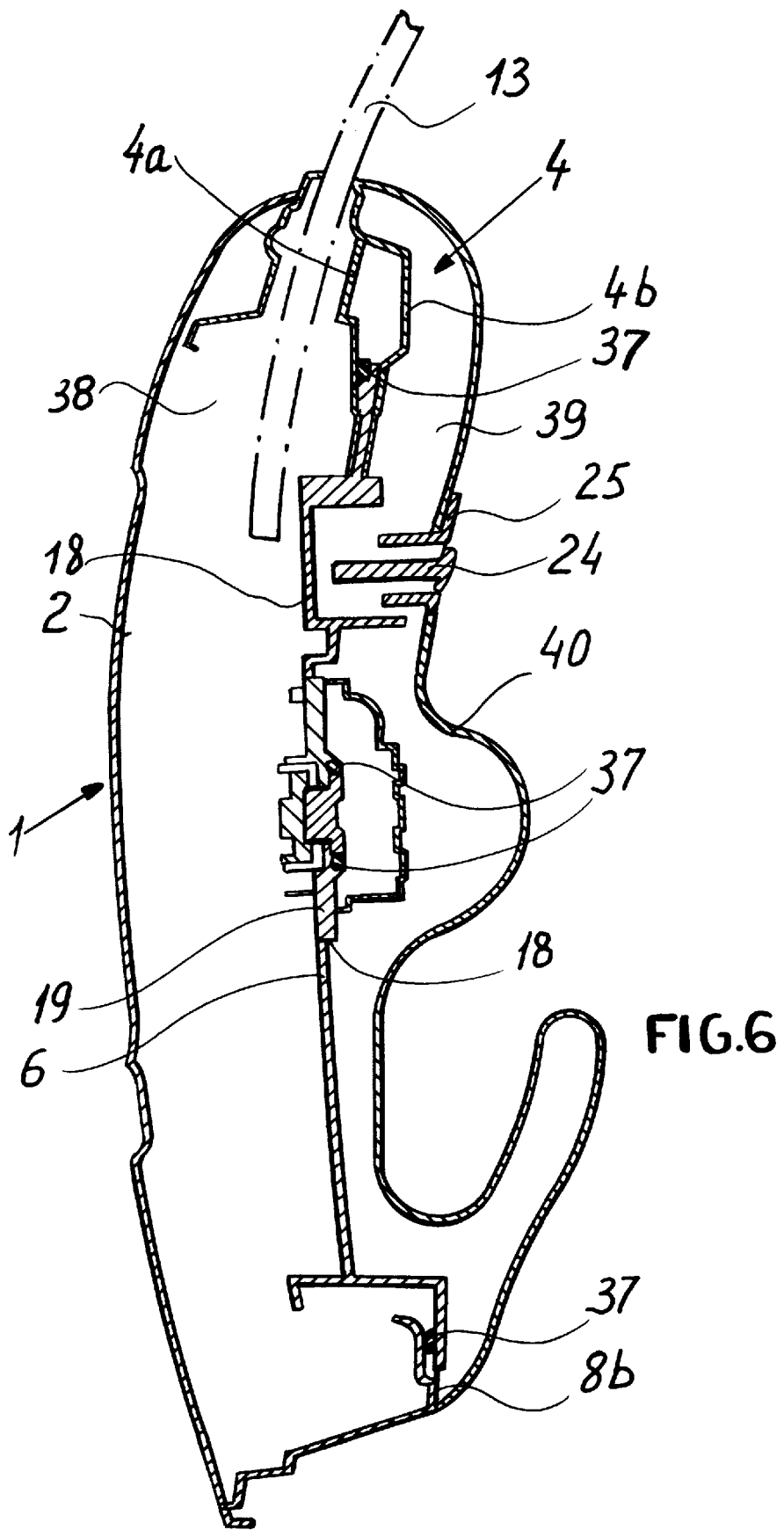
FIG. 6 is a vertical section through the door with some parts removed for clarity of view.
Figure 7:
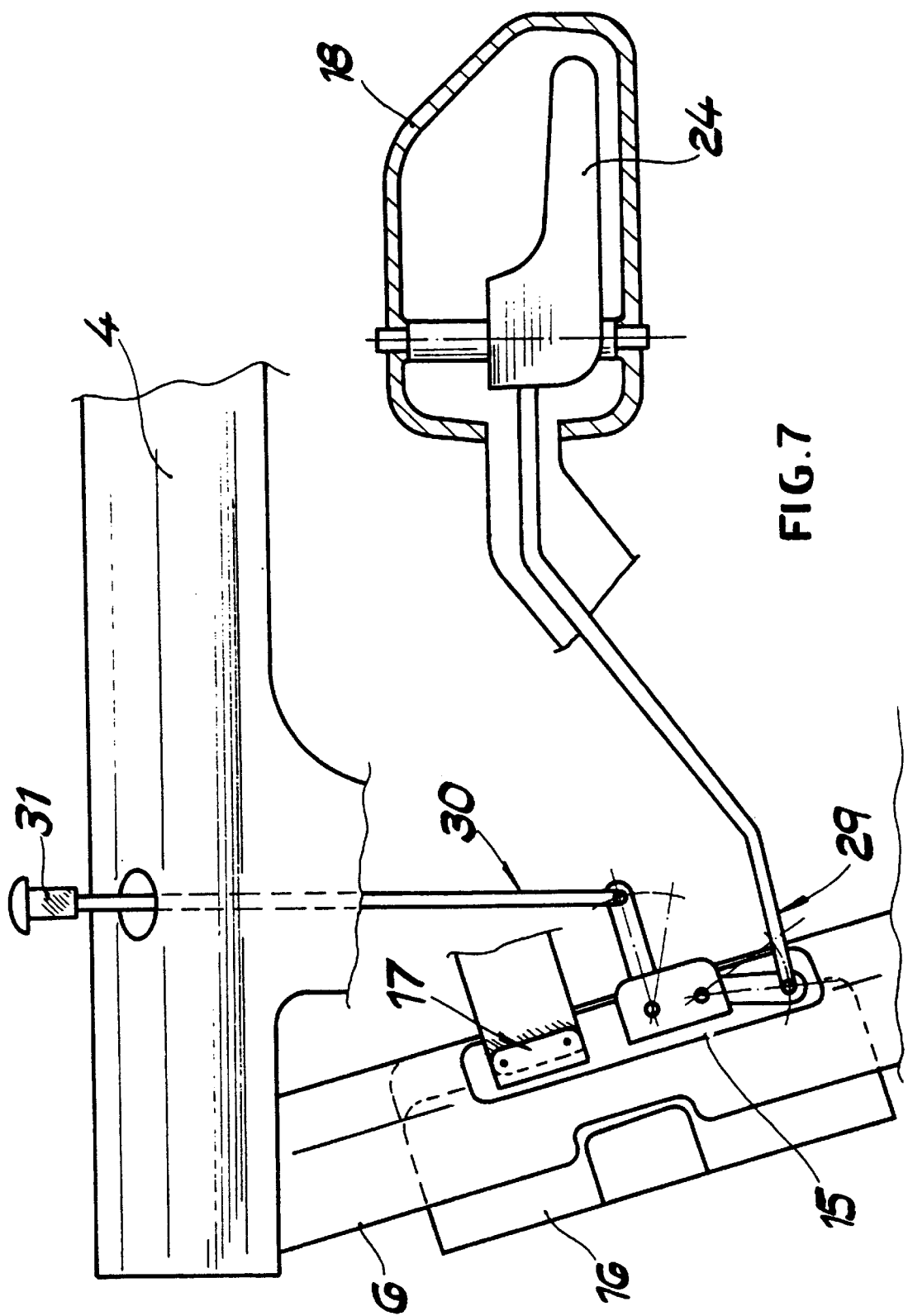
FIG. 7 is a somewhat enlarged view of the door according to the invention.
Figure 8:
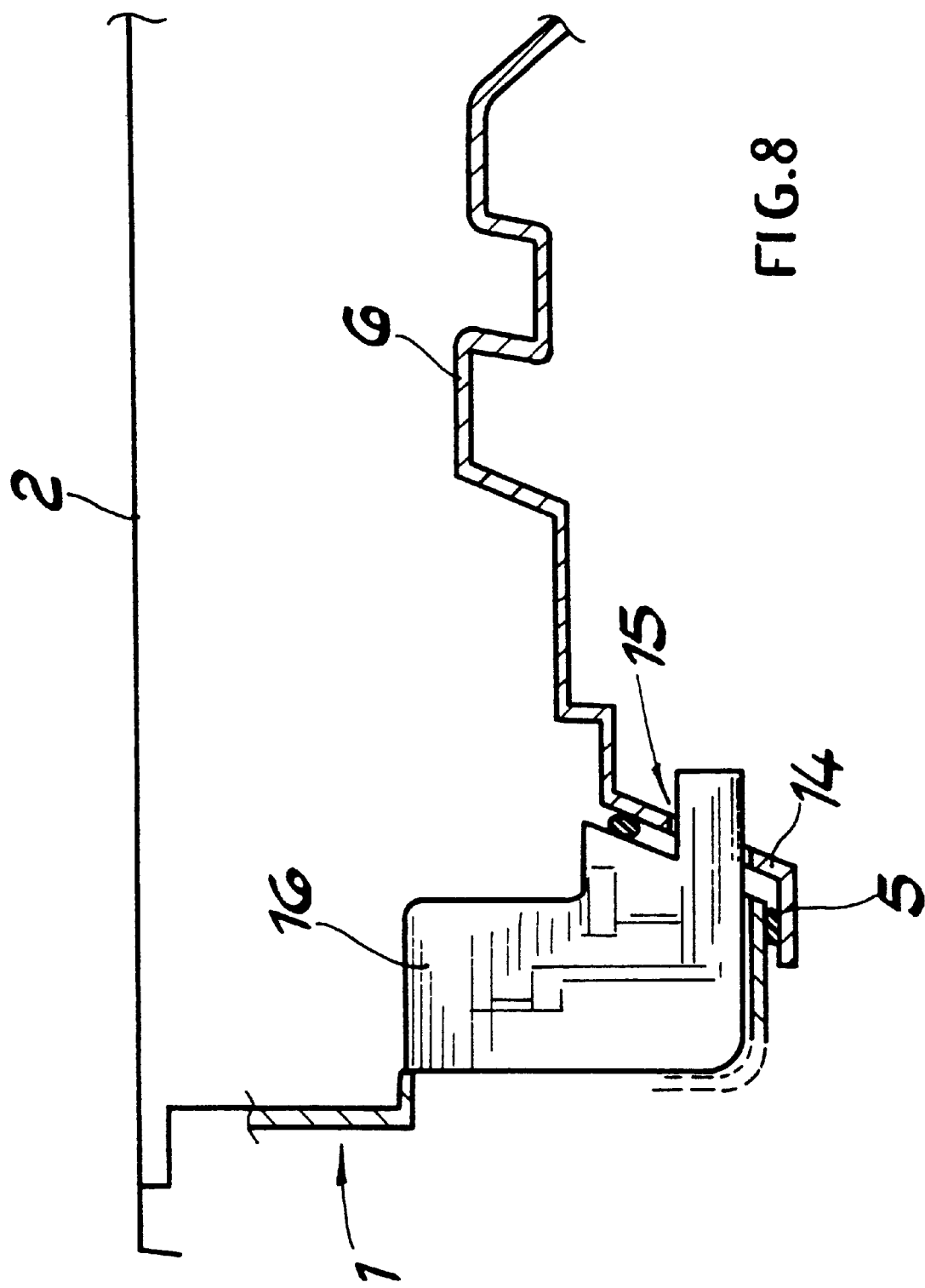
FIG. 8 is a horizontal section through the door adjacent its latch.
Figure 9:
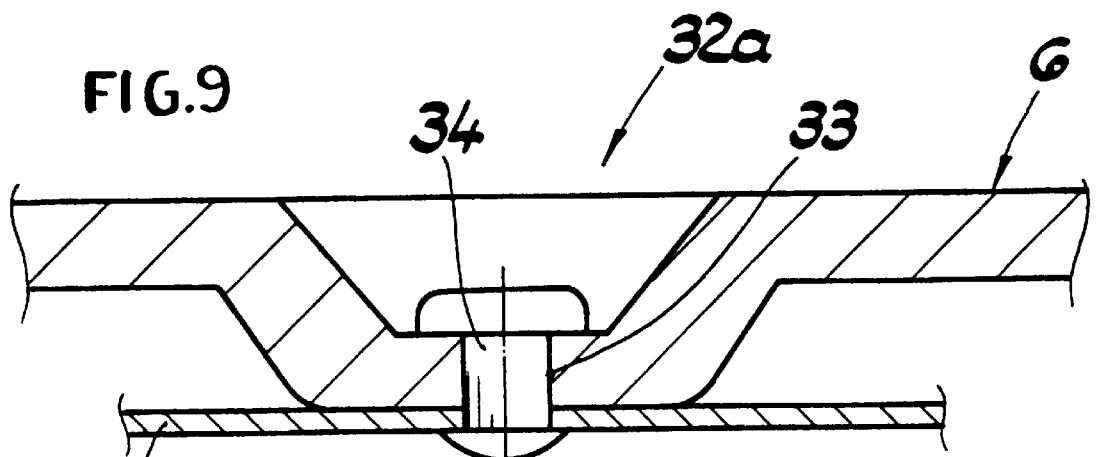
FIG. 9 is a large-scale horizontal section taken along line IX—IX of FIG. 2.
Figure 10:
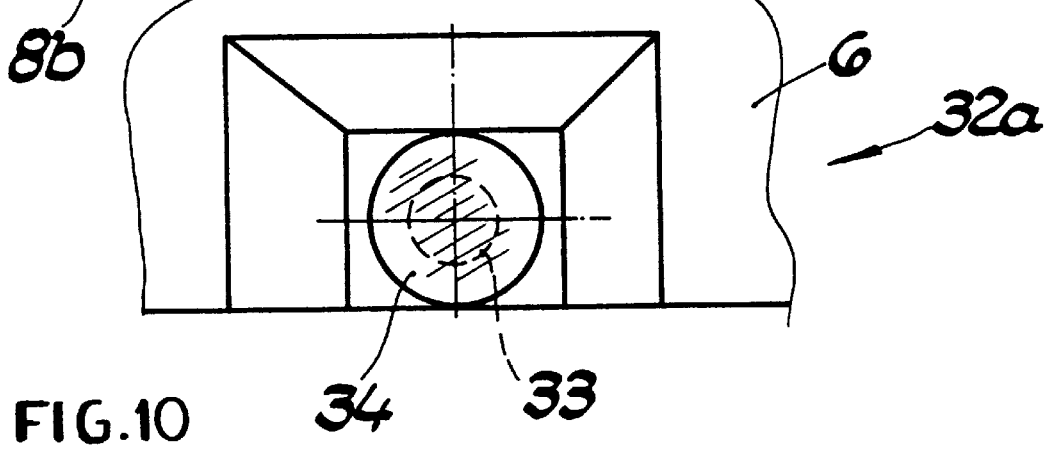
FIG. 10 is a side view of the structure of FIG. 9.

The insert plate 6 is unitarily formed of plastic with the lugs 9 and with guides 11 for mounting rods 12 (see FIG. 3) of the window 13. Along its rear edge as shown in FIG. 8 it is formed with a bent-back mounting flange 14 formed with an aperture 15 through which extends the latch 16 and its electrical connection 17 (FIG. 7). In addition the insert plate 6 is formed with bumps, recesses, and seats 18 for mounting an electrical motor 19 for operating the window-raising mechanism 20, for holding an electrical controller 21, and air bag 22, one or more loud speakers 23, and even for the inside door handle 24. The seat 18 for the inside door handle 24 is provided with a shield 25 (FIG. 6). The controller 21 can operate the door latch 16, window operator 20, and even if necessary the unillustrated respective rear-view mirror.

Figure 3:
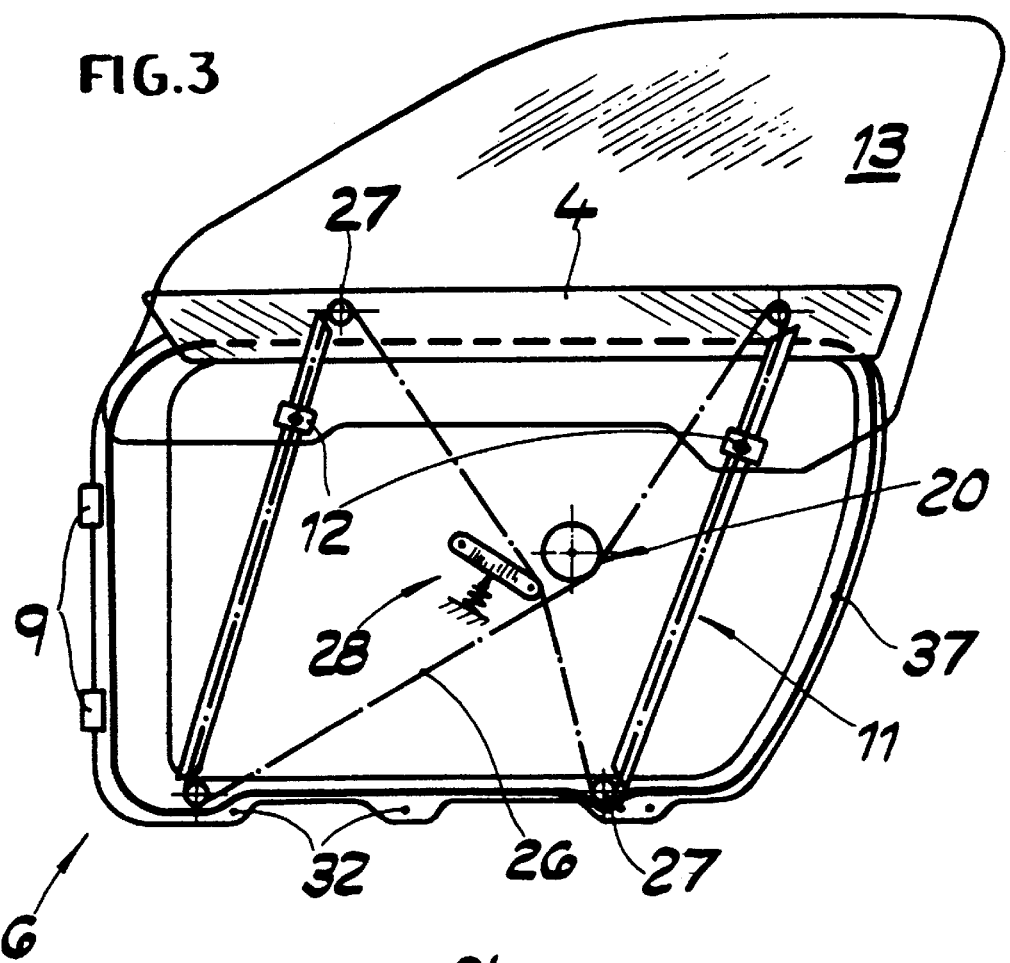
FIG. 3 shows the insert of FIG. 2 but from outside.
Figure 4:
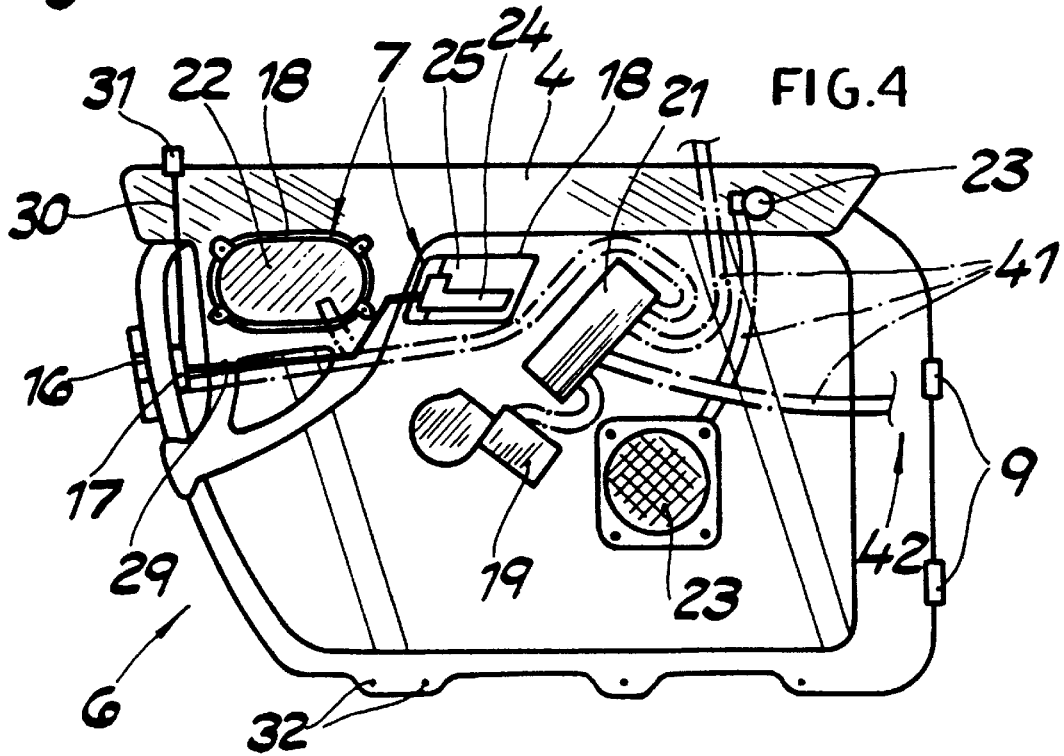
FIG. 4 is a view like FIG. 2 but showing some more details of the insert.

The window-raising mechanism 20 as shown in FIG. 3 comprises cables 26, rollers, a tensioner 28 and the above-mentioned drive motor 19. In addition the plastic insert plate 6 supports as shown in FIG. 7 a latch-actuating rod 29 extending between the handle 24 and the latch 15, and another rod 30 that extends up through the upper member 4 to a lock button 31 of conventional design.

Figure 5:
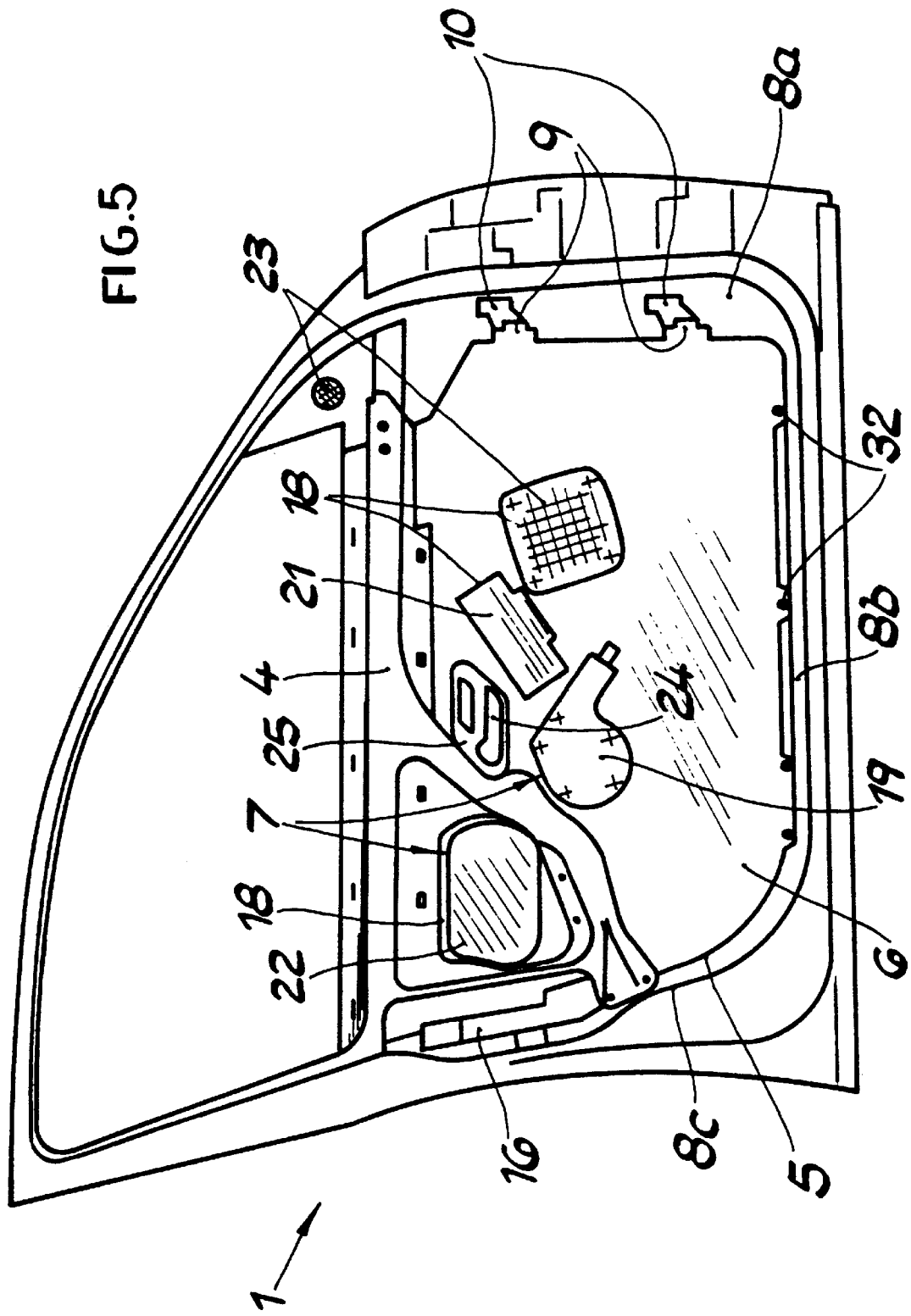
FIG. 5 is a view from inside illustrating the door shell with the insert in place.
Figure 12:
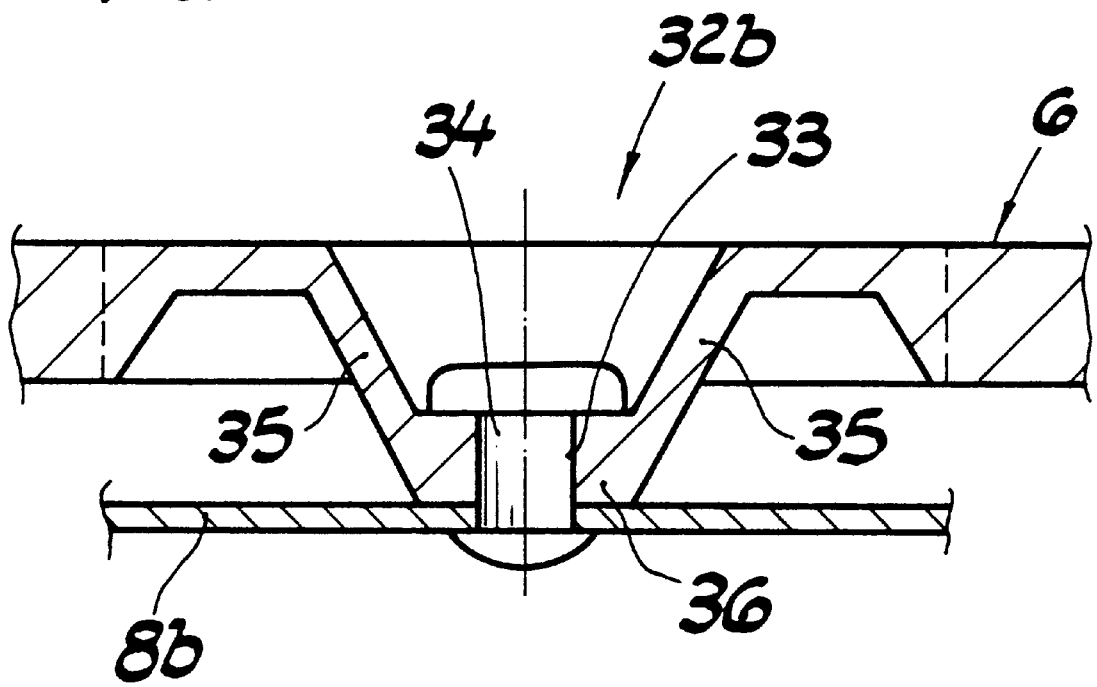
FIG. 12 is a section taken along line XII—XII of FIG. 2.
Figure 13:
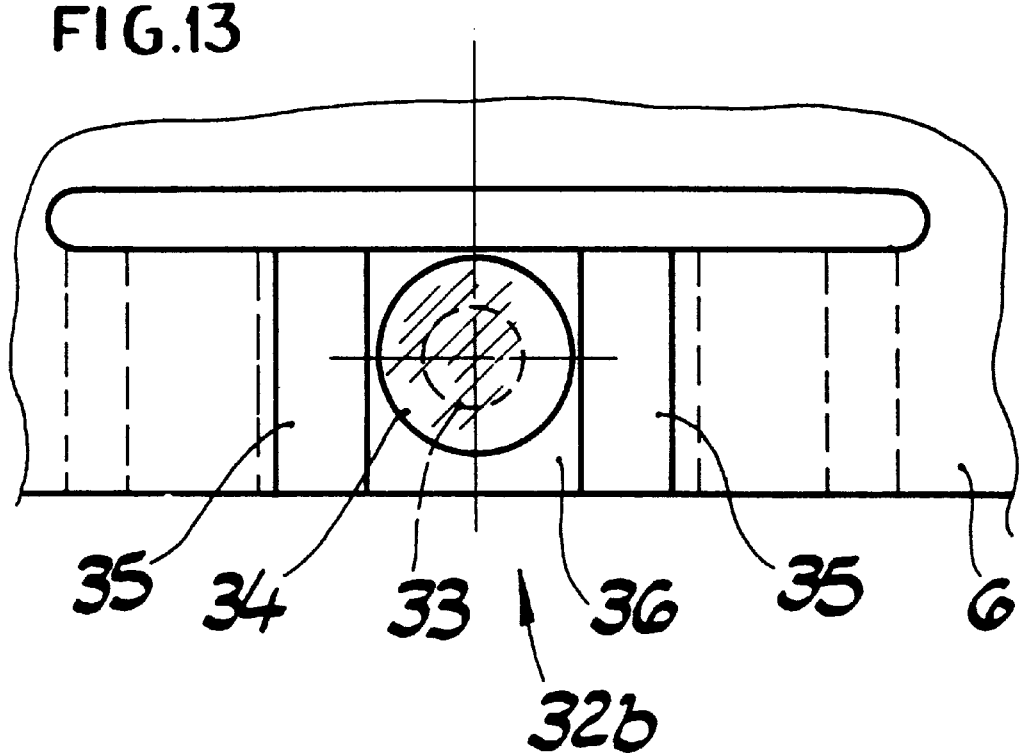
FIG. 13 is a side view of the structure of FIG. 12.
Figure 14:
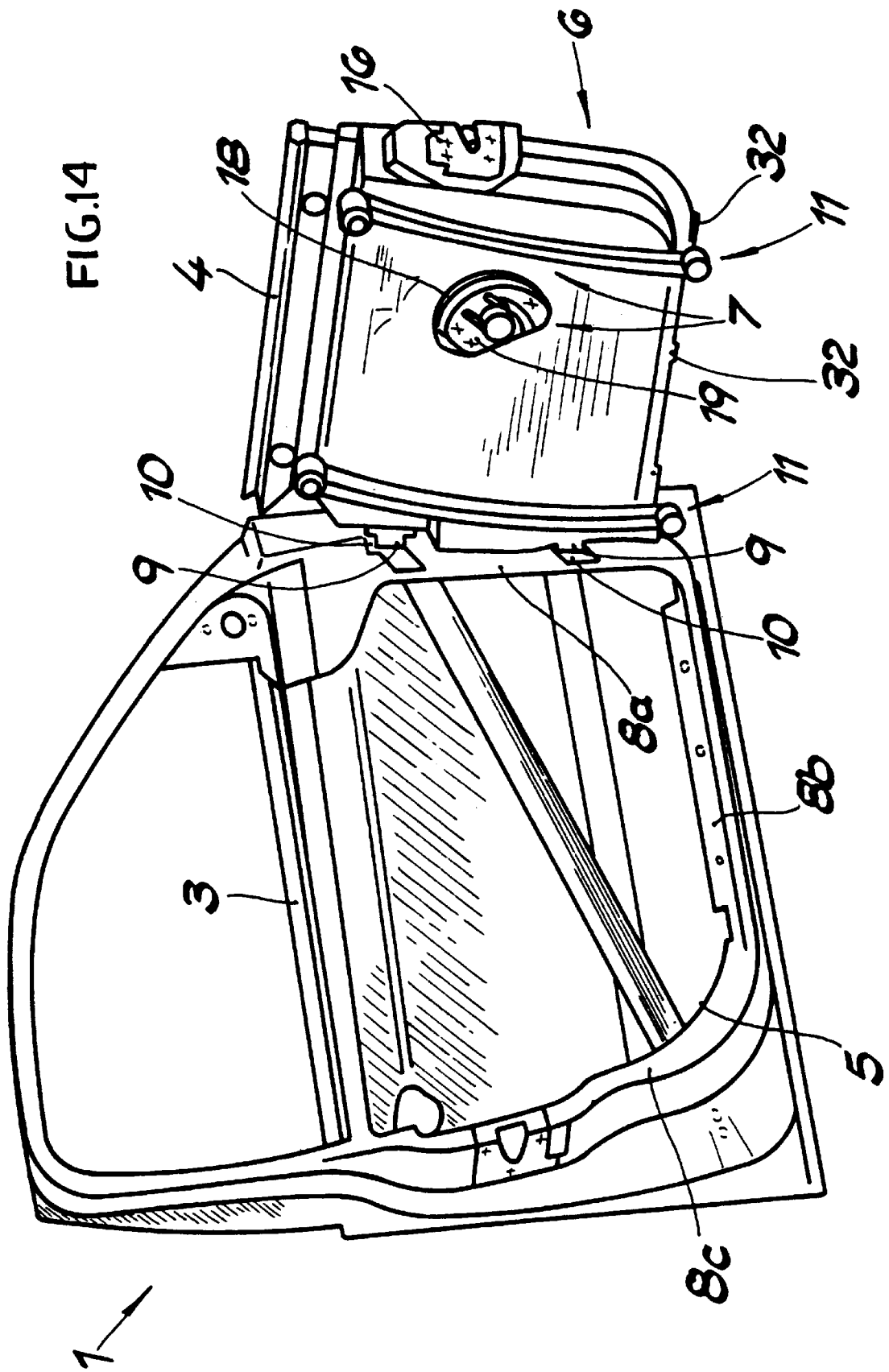
FIG. 14 is a perspective view of the door as it is being assembled.

The inside-panel upper member 4 is formed of metal with an outside profile 4a (FIG. 5) and an inside profile 4b and is mounted right on the plastic insert plate 6. In its lower region the plate 6 has a plurality of attachment formations 32 for connection to the lower frame member 8b of the inner door plate 8 of the door 1. The outermost and rearmost such formation 32 is constituted as a fixed attachment 32 while the remaining attachments 32b are movable, principally in the horizontal travel direction (right to left in FIG. 1). The attachment formations 32 are formed as trapezoidal recesses with bores 33 through which are inserted rivets 34. The movable attachment formations 32b as shown in FIGS. 12 and 13 have flanks 35 of relatively thin wall thickness so as to be elastically flexible and a floor 36 that is substantially thicker, so they can permit some movement between the plate 6 and the frame member 8b.

Figure 11:
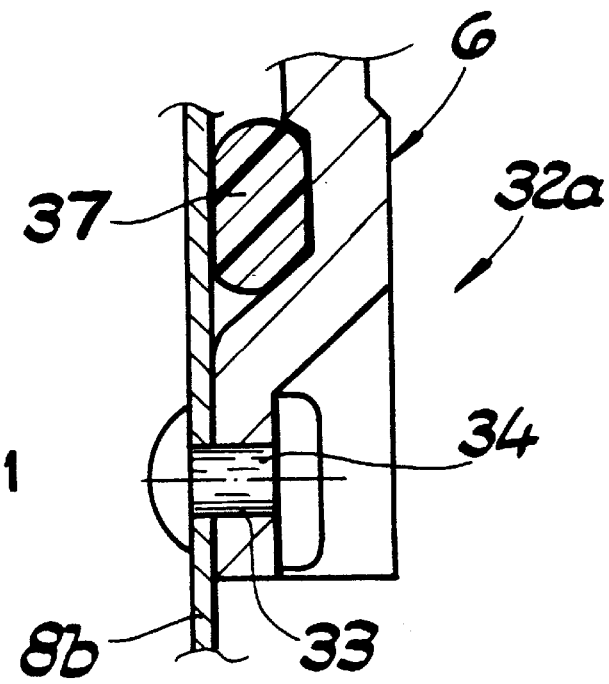
FIG. 11 is vertical section taken through the structure of FIG. 9.

The insert plate 6 has a seal 37 (FIGS. 6 and 11) around its outer edge and the edges of any holes through it so as to subdivide the space inside the door into an outer compartment 38 into which water may enter via the window slot and a dry inner compartment 39 holding all the critical electrical components. A decorative inner panel 40 (FIG. 6) is fitted over the insert panel 6 and inner door frame 8 in the completed door 1, secured as is standard to the members 4, 8a, 8b, and 8c.

The insert plate 6 carries virtually all the components that are to be mounted in or on the door 1. The various electrical components 7 are interconnected by a conductor tape 41 fixed on the plate 6. A connection 42 is made near the front door post to the vehicle's power supply and control circuitry.

We claim:

1. A motor-vehicle door comprising:

an outer door panel;

an annular inner door panel including a front frame member fixed to the outer door panel, a lower frame member fixed to the outer door panel, a separate upper frame member, and a rear frame member fixed to the outer door panel, the front, lower, and rear members together forming an opening, the front frame member being formed with a pair of vertically spaced hinge holes each having a horizontal front part and a downwardly and rearwardly inclined rear part;

an insert plate carrying the upper frame member, fitting in the opening, and provided with hinge lugs engaged in the openings, the insert plate being pivotal about the lugs in the hinge holes between a raised position projecting inward from the door and a lowered position fitting in the opening;

mechanical, electromechanical, and electronic subassemblies fixed on the insert plate; and fasteners retaining the insert plate on the inner door panel in the lowered position of the plate.

2. The motor-vehicle door defined in claim 1 wherein the plate is unitarily formed of plastic with the lugs and with guides, the subassemblies including a window having sliders displaceable in the guides.

3. The motor-vehicle door defined in claim 2 wherein the plate has a rear edge formed as an offset flange in turn formed with a throughgoing hole, the subassemblies including a latch engaging through the hole.

4. The motor-vehicle door defined in claim 3 wherein the plate is formed with a plurality of seats, the subassemblies including;

a drive in one of the seats for the window;

an air bag in another of the seats;

an electronic controller in another of the seats;

a loudspeaker in another of the seats;

an inside door handle in another of the seats.

5. The motor-vehicle door defined in claim 3 wherein the subassemblies include cables and rollers mounted on the plate and connected between the drive and the window.

6. The motor-vehicle door defined in claim 5 wherein the subassemblies include an inside lock rod connected to the latch and mounted on the plate.

7. The motor-vehicle door defined in claim 1 wherein the upper frame member is a pair of joined-together metallic profiles fixed to an upper edge of the plate.

8. The motor-vehicle door defined in claim 1 wherein the plate has a lower edge formed with a rearmost fixed attachment location and, forward therefrom, a plurality of movable attachment locations, the fasteners projecting through the attachment locations into the lower frame member.

9. The motor-vehicle door defined in claim 8 wherein the attachment locations are formed as frustopyramidal projections having flat apices through which the respective fasteners project and side walls, the side walls of the movable attachment locations being of reduced wall thickness and elastically deformable.

10. The motor-vehicle door defined in claim 1, further comprising a peripheral seal between the insert plate and the members.

11. The motor-vehicle door defined in claim 1, further comprising an electrical connection tape interconnecting the electromechanical and electronic subassemblies and mounted on the plate.

* * * * *